United States Patent [19]

Pettersson

[11] Patent Number: 5,634,233

[45] Date of Patent: Jun. 3, 1997

[54] DEVICE FOR CLEANING THE WIPER BLADE OF A VEHICLE WINDSCREEN WIPER

[76] Inventor: Dick Pettersson, Solängsvägen 146, S-191 54 Sollentuna, Sweden

[21] Appl. No.: 373,089

[22] Filed: Jan. 17, 1995

[30] Foreign Application Priority Data

Jan. 17, 1994 [SE] Sweden ........................... 9400092

[51] Int. Cl.$^6$ ................ B60S 1/02; B60S 1/62
[52] U.S. Cl. ............. 15/250.001; 15/246; 15/250.19
[58] Field of Search ................. 15/246, 250.19, 15/250.001, 250.16, 250.17, 236.01, 236.08, 257.01; 296/96.15; 451/415, 526, 54

[56] References Cited

U.S. PATENT DOCUMENTS

| | | | |
|---|---|---|---|
| 1,732,417 | 10/1929 | Pritchard | 15/250.19 |
| 2,974,340 | 3/1961 | Kopczynski | 15/250 |
| 3,546,825 | 12/1970 | Dale | 15/250.001 |
| 3,613,318 | 10/1971 | Gianatasio | 15/250.001 |
| 3,908,222 | 9/1975 | Scott | 15/250.19 |
| 4,378,484 | 3/1983 | Kunert | 15/250.19 |
| 4,616,376 | 11/1986 | Paretskoi | 15/250.001 |
| 4,685,168 | 8/1987 | Mastromoro | 15/250 |
| 5,226,199 | 7/1993 | Jacoby | 15/250 |

FOREIGN PATENT DOCUMENTS

| | | | |
|---|---|---|---|
| 1911991 | 9/1970 | Germany. | |
| 3138388 | 8/1982 | Germany. | |
| 1512327 | 6/1978 | United Kingdom | 15/250.19 |

*Primary Examiner*—Gary K. Graham
*Attorney, Agent, or Firm*—John Lezdey & Associates

[57] ABSTRACT

A device for cleaning the wiper blades of a vehicle windscreen wiper, wherein the device has the form of a self-adhesive flat foil strip which is intended to be affixed to the outside of the windscreen of the vehicle in the region of the path swept out by the wiper blade. The side of the strip which faces outwardly when the strip is affixed to the windscreen presents at least two smooth, sharp-edged rectangular ribs of rectangular cross-section which extend continuously along the full length of the strip and which are spaced from one another and from the respective edges of the strip.

7 Claims, 1 Drawing Sheet

DEVICE FOR CLEANING THE WIPER BLADE OF A VEHICLE WINDSCREEN WIPER

BACKGROUND OF THE INVENTION

1. Field of the Invention

The present invention relates to a device for cleaning the wiper blades of window wipers, such as vehicle windscreen or windshield wipers. The device has the form of a self-adhesive flat strip which is intended to be fastened to the outer surface of the vehicle windscreen in the region of the sweeping movement of the wiper blade.

2. Description of the Prior Art

When an automotive vehicle is driven on wet and muddy roads, particularly in the rain, dirt and grease of different kinds adhere to the windscreen wiper blades/headlamp wiper blades of the vehicle. In time, the initially smooth wiping surfaces of the wiper blades become uneven, thereby greatly impairing the wiping effect of the blades. Different devices for cleaning wiper blades from contaminants that adhere thereto and for restoring the wiping surfaces of such blades to their original smooth state are commercially available. These devices typically include a narrow gap which is located between two opposing scraper surfaces and which is intended to be placed manually over and drawn along a wiper blade with the intention of cleaning the blade. Cleaning devices of this kind, however, cannot be used while the vehicle is being driven, when the need is greatest. Attempts have been made to solve this problem by providing in the windscreen, immediately upstream of the lower turning position of a wiper blade, a sharp-edged recess over which the wiper blade is intended to sweep as it moves. One drawback with this solution, however, is that a newly fitted wiper blade will also pass over the cleaning device, resulting in premature wear of the wiper blade. The intention with a cleaning device of the kind meant here is for the device to begin to function only when the wiper blade begins to wear, i.e. after a new wiper blade has been used for some time. Accordingly, it has been proposed to attach to the windscreen a foil strip which while having the same function as the scraper fitted into the windscreen can be applied subsequently, when the wiper blade begins to wear. A foil strip of this kind is known from U.S. Pat. No. 4,685,168. Although this smooth cleaner strip is simple, it fails to provide the desired cleaning effect and because of its relatively large thickness results in rapid wear on the wiper blade. An attempt to solve the cleaning problem is described in U.S. Pat. No. 5,226,199, which teaches a windscreen mounted strip which is provided with a zig-zag pattern or a wart-like pattern with the hope that the cleaning effect will be improved in this way. The ridges formed by the warts or the zig-zag pattern have a rounded shape. Apart from the fact that the strip is relatively expensive in manufacture, it also fails to provide the desired cleaning effect. Other cleaning patterns are also known to the art. For instance, DE 3,138, 388 teaches a foil strip which has an arched or curved profile shape and which includes longitudinally extending sharp-edged furrows. Because the furrows are formed in the strip, it is necessary for the strip to be relatively thick (seen in relation to the product concerned), and consequently it is necessary to profile the strip with the aforesaid arched or curved configuration. As a result, the strip is expensive in manufacture and does not provide a satisfactory cleaning effect.

One object of the present invention is to solve the problems associated with known cleaning devices, while another object of the invention is to provide a device which can be easily fitted to a windscreen with the intention of keeping the wiper blades clean. Both objects are achieved in accordance with the invention with a device having the characteristic features defined in the claims.

SUMMARY OF THE INVENTION

The present invention discloses a device for cleaning the wiper blades of a vehicle windscreen wiper, wherein the device has the form of a self-adhesive flat foil strip which is intended to be affixed to the outside of the windscreen of the vehicle in the region of the path swept out by a wiper blade. It is characterized by the outwardly facing side of the strip when affixed to the windscreen and presents at least two smooth, sharp-edged ribs of rectangular cross-section which extend continuously along the full length of the strip and which are spaced from one another and from the respective edges of the strip.

BRIEF DESCRIPTION OF THE DRAWINGS

The invention will now be described in more detail with reference to an exemplifying embodiment thereof and also with reference to the accompanying drawing, in which.

DESCRIPTION OF THE PREFERRED EMBODIMENT

Figure 1:
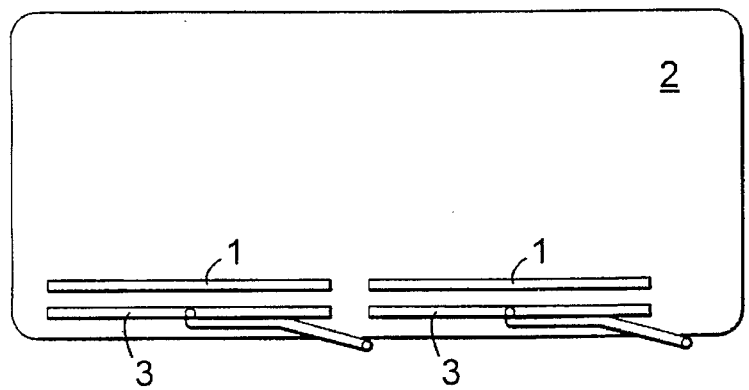
FIG. 1 is a schematic front view of a vehicle windscreen wiper, and also shows an inventive device fitted to the windscreen.

The inventive cleaning device is referenced 1. Also shown schematically in FIG. 1 is a vehicle windscreen 2 on which two windscreen wipers 3 are mounted. As will be seen from the Figure, each cleaning device 1 is mounted immediately above the bottom turning position of the windscreen wipers 3, such that the cleaning devices will be located in the fields swept by respective wipers.

Figure 2:
FIG. 2 is a sectional view in larger scale of one embodiment of the inventive device.

FIG. 2 illustrates the inventive cleaning device, wherein reference numeral 4 identifies the self-adhesive foil strip. The side of the strip opposite the adhesive-coated side, i.e. the side of the device that is intended to face outwardly from the windscreen and which is in contact with a wiper blade as it moves, is provided with two sharp-edged, smooth ribs 5 which have a rectangular cross-section and which extend continuously along the strip.

Figure 3:
FIG. 3 is a sectional view of another embodiment of said device.

In the embodiment illustrated in FIG. 3, the foil strip 4 includes three smooth, sharp-edged ribs 6 and 7 of rectangular cross-section which extend continuously along the strip, instead of only two ribs as in the FIG. 2 embodiment. According to one preferred embodiment of the invention, there extends along one edge of the strip in spaced relationship with said edge a rib 6 which has a width (a) of roughly 4 mm and a thickness of 0.1–0.5 mm. The distance (b) from the nearest strip edge is about 3 mm. Two further, mutually spaced ribs 7 are mounted along the other edge of the foil strip and spaced therefrom. These ribs 7 have a width (c) of about 2 mm and a thickness of 0.1–0.5 mm. The distance (d) of the outermost rib from the edge of the strip is about 3 mm and the distance (e) between the ribs 7 is about 2 mm. As a result of this configuration and positioning of the ribs 6, 7 on the strip 4 and by placing the strip on the windscreen such that the rib 6 will be located at the top there is obtained below and between the ribs 5 a water and mud trap, therewith resulting in highly effective cleaning of the windscreen.

Figure 4:
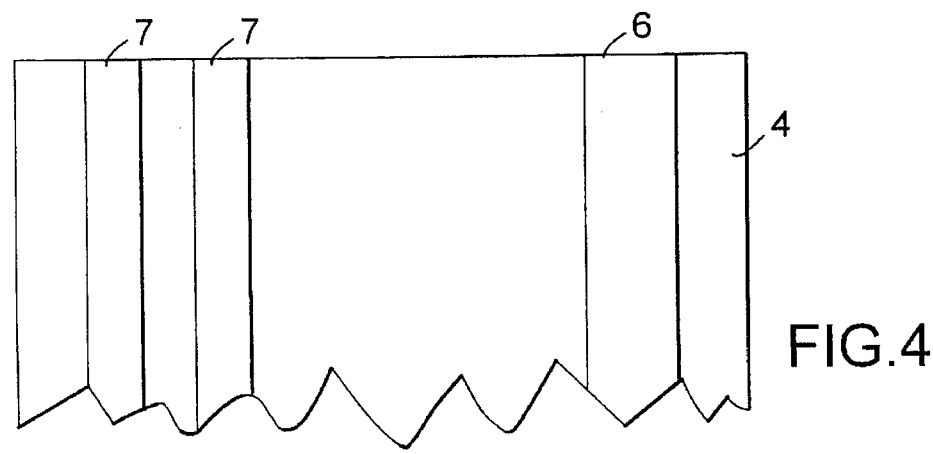
FIG. 4 is a view from the front or from above of the device shown in FIG. 3, with the device being shown broken in its length direction.
Figure 4:
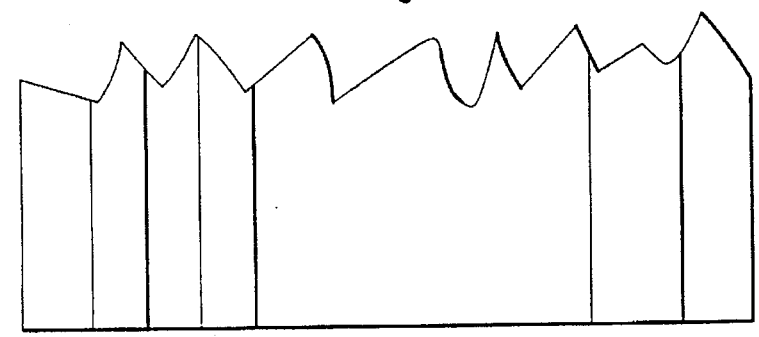

FIG. 4 shows the strip 4 illustrated in FIG. 3 when seen from above, with the strip broken in its long direction, and clearly shows the positioning of the ribs 5, 6 and 7 on the strip 4.

The foil strip itself and the ribs provided thereon form longitudinally extending sharp doctor-blade edges which extend transversely to the direction of wiper blade movement and which through their action on respective wiper blades wipe the blade clean while, at the same time, sharpening the blade as it moves over the inventive cleaning device.

Alternatively, the foil strip 1 is replaced with one made from moulded vinyl. The doctor-blade edges (not shown) formed by the edges of the strip and ribs can be reinforced with a thermosetting resin or metal filaments.

It will be understood that the inventive strip is self-adhesive and shall be affixed to the windscreen, preferably as shown in FIG. 1, when the cleaning capacity of the wiper blades has been reduced.

I claim:

1. A vehicle windshield cleaning system for cleaning a windshield having an outside and an inside; the windshield cleaning system comprising at least one wiper blade for movement over the windshield and a blade cleaning device; the blade cleaning device comprising an elongated, self-adhesive straight, flat strip affixed horizontally to the outside of the windshield in a region of a path swept out by the wiper blade; the flat strip having an outward facing side, an inward facing side and opposite side edges; wherein the outwardly facing side of the strip includes means for cleaning and sharpening the wiper blade; the cleaning and sharpening means comprising at least first, second and third elongated, smooth, sharp-edged ribs extending continuously along and coextensive with the length of the strip, said ribs are each rectangular in transverse cross-section, and are spaced from one another and from the opposite side edges of the strip such that the wiper blade is cleaned and sharpened when it passes over the blade cleaning device; and wherein said first rib is located adjacent to and at a distance from one edge of the strip, and wherein said second and third ribs are each spaced mutually from one another and from the other edge of the strip such that a water and mud trap is formed, the distance between said second and third ribs being less than the distance between said first and second fibs, and said first and third fibs.

2. A system according to claim 1, wherein each rib has a thickness of about 0.1–0.5 mm.

3. A system according to claim 1, wherein the first rib has a width of about 4 mm.

4. A system according to claim 1, wherein the second and third ribs have a width of about 2 mm.

5. A system according to claim 1, wherein said first rib has a width of about 4 mm and said second and third ribs each have a width of about 2 mm.

6. A system according to claim 1, wherein the ribs are about 2–4 mm in width.

7. A system according to claim 1, wherein the flat strip comprises a material selected from the group consisting of foil and vinyl.

* * * * *